(12) United States Patent
Morey et al.

(10) Patent No.: US 7,399,332 B1
(45) Date of Patent: Jul. 15, 2008

(54) FILTER CUP

(75) Inventors: Kevin R. Morey, Perrysburg, OH (US); Mark Rupp, Whitehouse, OH (US)

(73) Assignee: NSS Enterprises, Inc., Toledo, OH (US)

( * ) Notice: Subject to any disclaimer, the term of this patent is extended or adjusted under 35 U.S.C. 154(b) by 686 days.

(21) Appl. No.: 11/110,270

(22) Filed: Apr. 20, 2005

(51) Int. Cl.
*B01D 35/30* (2006.01)
*B01D 45/12* (2006.01)

(52) U.S. Cl. .............................. 55/318; 55/337; 55/429; 55/DIG. 3

(58) Field of Classification Search ................ 55/318, 55/337, 429, DIG. 3
See application file for complete search history.

(56) References Cited

U.S. PATENT DOCUMENTS

| | | | |
|---|---|---|---|
| 2,296,359 A | 9/1942 | Martinent | |
| D186,583 S | 11/1959 | Gaudry et al. | |
| 2,943,698 A | 7/1960 | Bishop | |
| 3,016,984 A | 1/1962 | Getzen | |
| 3,296,777 A | 1/1967 | Jackson et al. | |
| 4,185,974 A | 1/1980 | Hiester | |
| 4,826,515 A | 5/1989 | Dyson | |
| 4,853,011 A | 8/1989 | Dyson | |
| 4,906,265 A | 3/1990 | Berfield | |
| 5,080,697 A | 1/1992 | Finke | |
| 5,344,559 A | 9/1994 | Van Ooijen | |
| 5,735,403 A | 4/1998 | Stiglianese | |
| 5,855,634 A | 1/1999 | Berfield | |
| D425,677 S | 5/2000 | Williamson | |
| 6,146,434 A | 11/2000 | Scalfani et al. | |
| D437,466 S | 2/2001 | Song | |
| 6,221,134 B1 | 4/2001 | Conrad et al. | |
| D453,595 S | 2/2002 | Stephens et al. | |
| 6,391,101 B2 | 5/2002 | Gustafson et al. | |
| 6,436,160 B1 | 8/2002 | Stephens et al. | |
| 6,440,191 B1 | 8/2002 | Berfield et al. | |
| 6,558,453 B2 | 5/2003 | Sepke et al. | |
| 6,613,116 B2 | 9/2003 | Oh | |
| D495,105 S | 8/2004 | Baldinger | |
| D495,458 S | 8/2004 | Baldinger | |
| 6,775,882 B2 | 8/2004 | Murphy et al. | |
| 6,810,557 B2 | 11/2004 | Hansen | |
| 2002/0011050 A1 | 1/2002 | Hansen et al. | |
| 2002/0166310 A1 | 11/2002 | Bilek et al. | |
| 2004/0034962 A1 | 2/2004 | Thur et al. | |
| 2004/0134022 A1 | 7/2004 | Murphy et al. | |
| 2004/0154126 A1 | 8/2004 | Hansen | |

FOREIGN PATENT DOCUMENTS

JP 2004167207 A * 6/2004

* cited by examiner

*Primary Examiner*—Robert A. Hopkins
(74) *Attorney, Agent, or Firm*—Marshall-Melhorn LLC (57) ABSTRACT

A filter cup having a shell with a plurality of apertures in an upper portion and an aperture free portion below the upper portion. A base plate adjacent the aperture free portion has at least one aperture therethrough.

17 Claims, 8 Drawing Sheets

FILTER CUP

FIELD OF THE INVENTION

The present invention relates to a filter cup for a vacuum system.

BACKGROUND OF THE INVENTION

Filter cups and filter cages are well-known devices often used in vacuums to support and/or protect a filter. Selected prior art filter cups and filter cages are described below.

U.S. Pat. No. 4,185,974 teaches a filter assembly 80 having a collar 82. The collar is designed to be secured to the lid 22. A filter cage 84 extends downwardly from the collar. The cage is comprised of a plurality of ribs 86. The ribs are constructed of plastic. The ribs are oriented so that the filter cage tapers from the portion secured to the collar to a bottom wall 94 of the cage. The ribs permit fluid, such as air, to flow between them into the filter element 150. An annular sleeve 106 extends upwardly from the bottom wall 94. A plurality of fluid slots are located in the annular sleeve.

U.S. Pat. No. 4,906,265 teaches a similar structure to that described in U.S. Pat. No. 4,185,974. More particularly, U.S. Pat. No. 4,906,265 teaches a filter assembly having a filter cage 20 having an open end and a closed end 24. The cage 20 is comprised of a plurality of vertical struts 26 which are circumferentially spaced apart. A plurality of open spaces 27 are defined by and between the vertical struts 26. The struts 26 are taught to taper slightly inwardly toward the closed end 24. A filter is located outside of the filter cage.

U.S. Pat. No. 5,344,559 depicts and describes a filter cartridge having two cylindrical filter cages 2, 3. Each filter cage has a plurality of openings 10 to permit fluid through the cages. A filter element 1 is disposed between the cages. Both ends of both filter cages are open.

U.S. Design Pat. No. D186,583 teaches a dust bag holder for a vacuum cleaner. The dust bag holder has an upper, circumferential lip connected to an upper portion of the holder. The holder has a plurality of slots located over the entire body portion. A plurality of holes is also located in the base of the holder.

U.S. Design Pat. Nos. D495,105 and D495,458 depict a filter cup assembly for a vacuum cleaner having an upper, circumferential lip and a mesh-like body downwardly depending from the lip. The mesh-like material appears to encircle the body except where four ribs extend between the lip and a bottom of the cup. A filter element is shown as being located within the filter cup in FIG. 2. The bottom of the filter cup, as shown in FIG. 6, is substantially solid.

U.S. Patent Application Publication No. US 2002/0011050 teaches a cylindrical separator 40, best seen in FIG. 11. Air passes through a preliminary filter element 44 of the separator. The air is drawn downwardly through a filter cup 120. A raised portion 70 of a motor cover 66 closes the base of the separator, except a plurality of apertures 72 in the cover 66 allow air to flow from the separator through the cover and escape into the atmosphere.

The prior art filter cups and filter cages described above suffer from several disadvantages. Specifically, the prior art cups and cages fail to protect the filter from directly impinging dirt and debris thus causing the filter to become clogged. Additionally, the prior art cups and cages fail to protect the filter from dirt and debris and also permit a sufficient quantity of air to flow through them and into the filter. In light of at least these disadvantages of the prior art devices, it would be advantageous to have a filter cup that protected the filter from dirt and debris from becoming lodged therein yet which freely permits air to pass through to the filter.

SUMMARY OF THE INVENTION

The present invention is a filter cup having a shell, a lip located about the shell and a base plate connected to the base of the shell. The shell preferably has a first portion with a plurality of apertures for permitting fluid to flow into an interior portion of the shell. The shell also preferably has an aperture-free, second portion. The base plate preferably has at least one aperture therethough.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
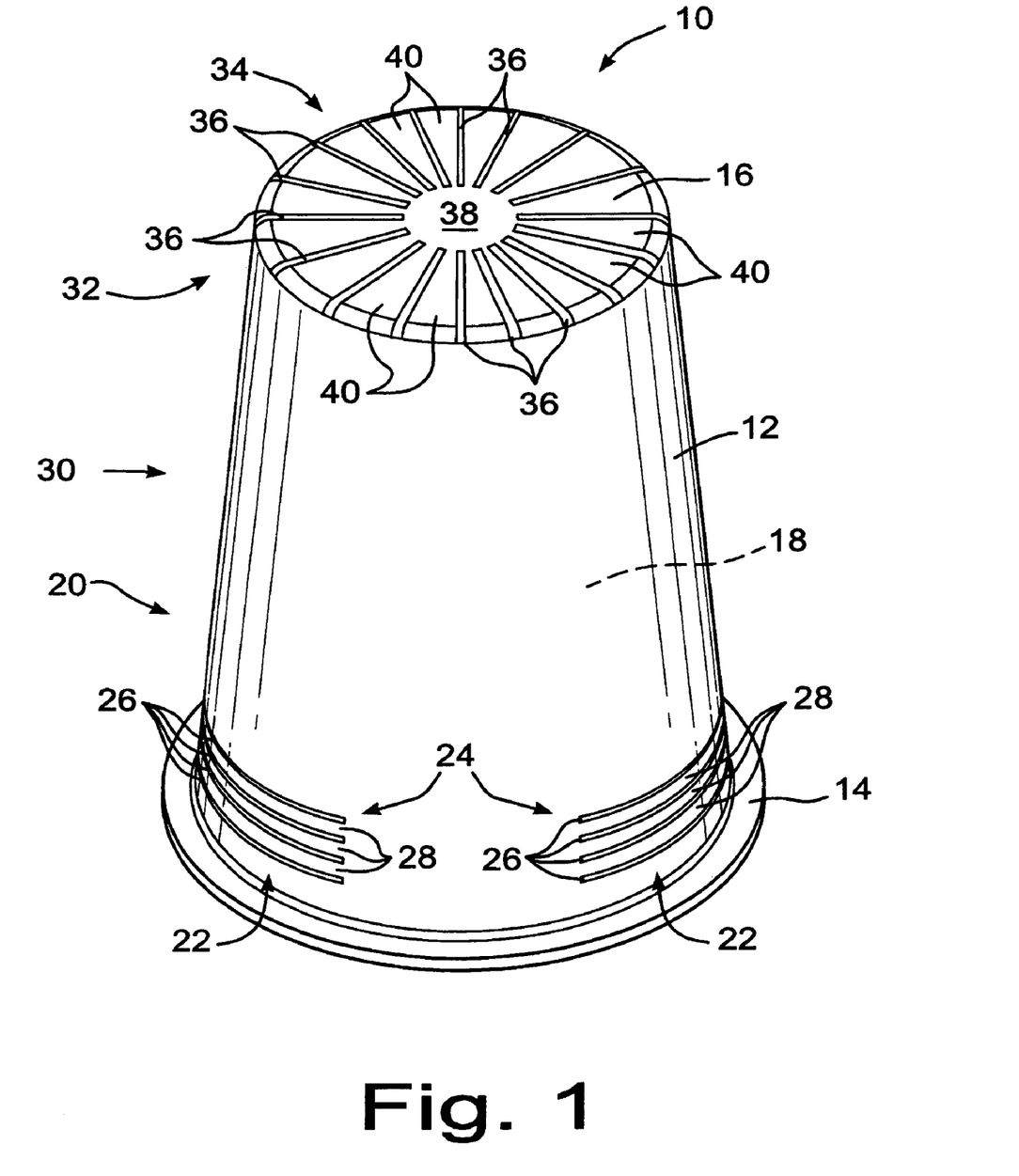
FIG. 1 is a perspective view of an upside-down filter cup of the present invention.
Figure 2:
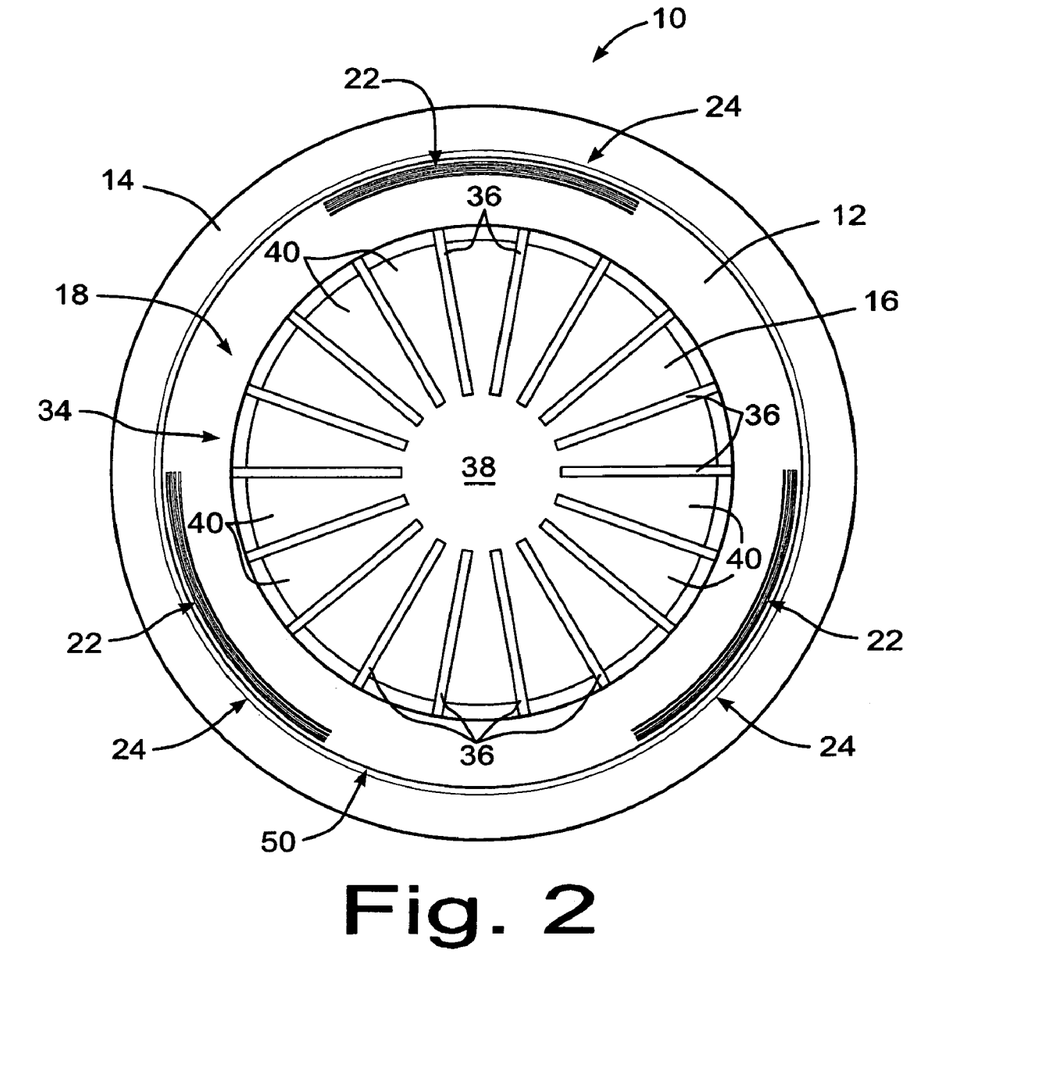
FIG. 2 is a top view of the filter cup of FIG. 1.

Referring to FIG. 1, a preferred embodiment of a filter cup 10 of the present invention is depicted. The filter cup 10 has a shell 12, a lip 14 located about the shell 12 and a base plate 16. The shell 12 preferably defines a substantially hollow interior portion 18, as best seen in FIG. 2.

Preferably, the shell 12 is cylindrical in construction. It is also within the scope of the present invention for the shell 12 to be a tapered cylinder having a taper from the lip 14 to the base plate 16. A tapered shell 12 is depicted in the figures.

Looking back at FIG. 1, a first, upper portion 20 of the shell 12 having a plurality of apertures 22 is depicted. The plurality of apertures 22 comprises multiple sets of slots 24. Preferably, the multiple sets of slots 24 are equally spaced circumferentially about the upper portion 20.

In the preferred embodiment, the individual slots 26 in the individual sets of slots 24 are substantially parallel with one another. The individual slots 26 are separated from one another by at least one rib 28.

Although multiple sets of slots 24 are depicted, it is within the scope of the present invention for the apertures 22 to comprise one or more slots 26 that may or may not be part of a set. It is also within the scope of the present invention for the apertures 22 to be other than slots 26. By way of example only, the apertures 22 may comprise holes or openings of any geometric design such as oval, round, square, rectangular, triangular or polygonal. The apertures 22 may be of any number, size, including apertures 22 of various designs, numbers and sizes, in any orientation and in any combination. As yet another example, the apertures 22 may be vertically oriented and/or diagonally oriented.

Figure 3:
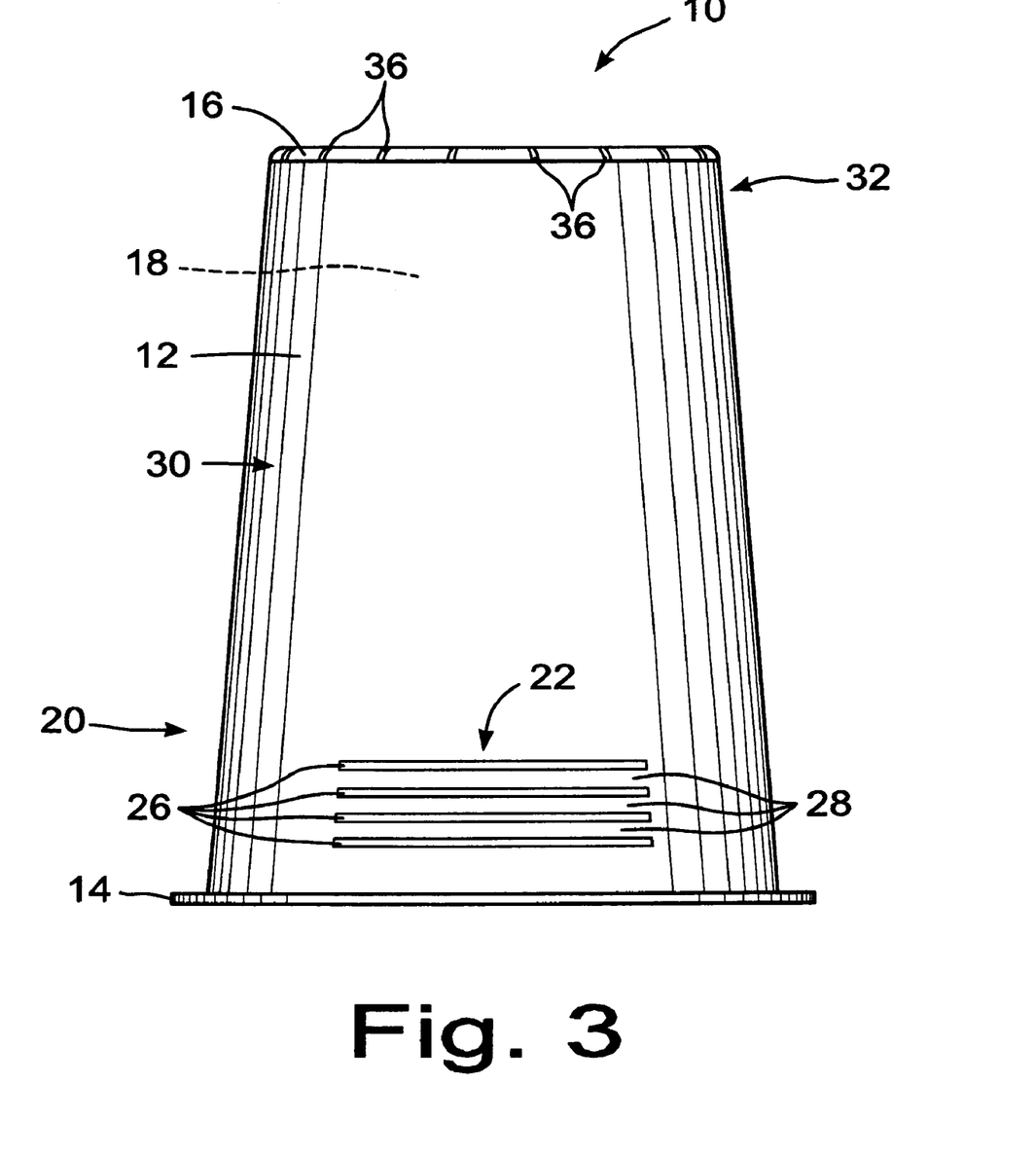
FIG. 3 is a side view of the filter cup of FIG. 1 with the upside down.

Looking now at FIGS. 1 and 3, it can be seen that the shell 12 also comprises a second portion 30 below the upper portion 20 and that the second portion 30 is substantially free of apertures. Preferably, the second, aperture-free portion 30 extends circumferentially about the shell 12.

The base plate 16 is located at the base 32 of the shell 12. The base plate 16 may be integrally formed with the shell 12 or it may be separately formed and attached to the shell 12. Attachment means may include, but are not limited to, mechanical fasteners, such as nuts and bolts, screws, nails, pegs and/or clamps, frictional fittings, adhesive, welding, and/or male/female connectors.

The base plate 16 has at least one aperture, as seen in FIGS. 1 and 2. In the preferred embodiment, the base plate 16 has a plurality of apertures 34. As best seen in FIG. 2, the apertures 34 are slots 36 that extend radially outward from a center portion 38 of the base plate 16. Preferably, the slots 36 are circumferentially spaced across the base plate 16. Individual ribs 40 separate the individual slots 36.

Figure 4:
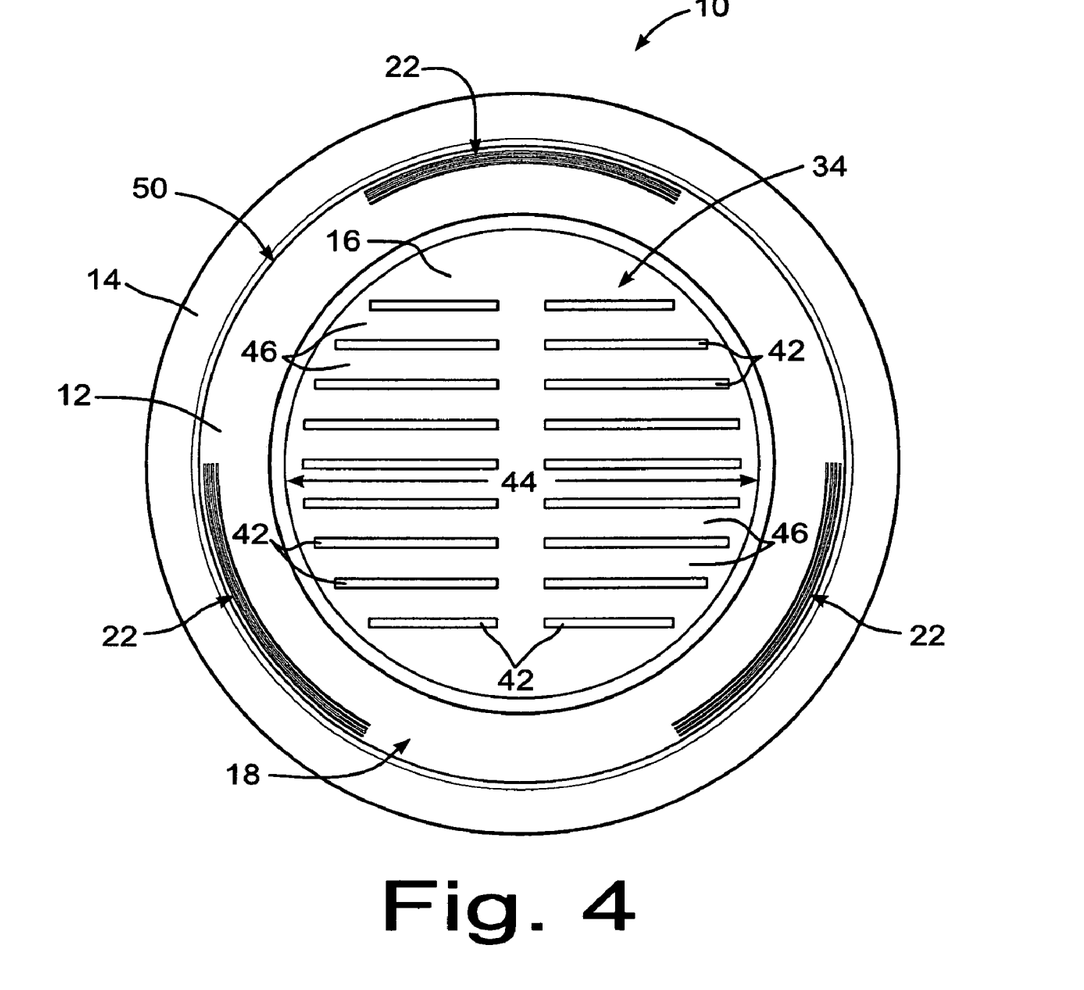
FIG. 4 is a top view of an alternative embodiment of a base plate of the present invention.

In an alternative embodiment depicted in FIG. 4, wherein like reference numbers are used for components of the present invention described above, the apertures 34 are parallel slots 42 that vary in length to one another. In one exemplary orientation of the slots 42, the slots 42 adjacent the greatest diameter portion 44 of the base plate 16 have the greatest length. The slots 42 gradually decrease in length as the distance from the greatest diameter portion 44 increases. Individual ribs 46 extend between each of the individual slots.

Although alternative designs of slots 24, 42 in the base plate 16 have been depicted and described thus far, it is well within the scope of the present invention for the plurality of apertures 34 to comprise apertures having a design other than a slotted design. By way of example only, the apertures 34 may comprise holes or openings of any geometric design such as oval, round, square, rectangular, triangular or polygonal. The apertures may be of any number, size, including apertures of various designs, numbers and sizes, in any orientation and in any combination.

Figure 5:
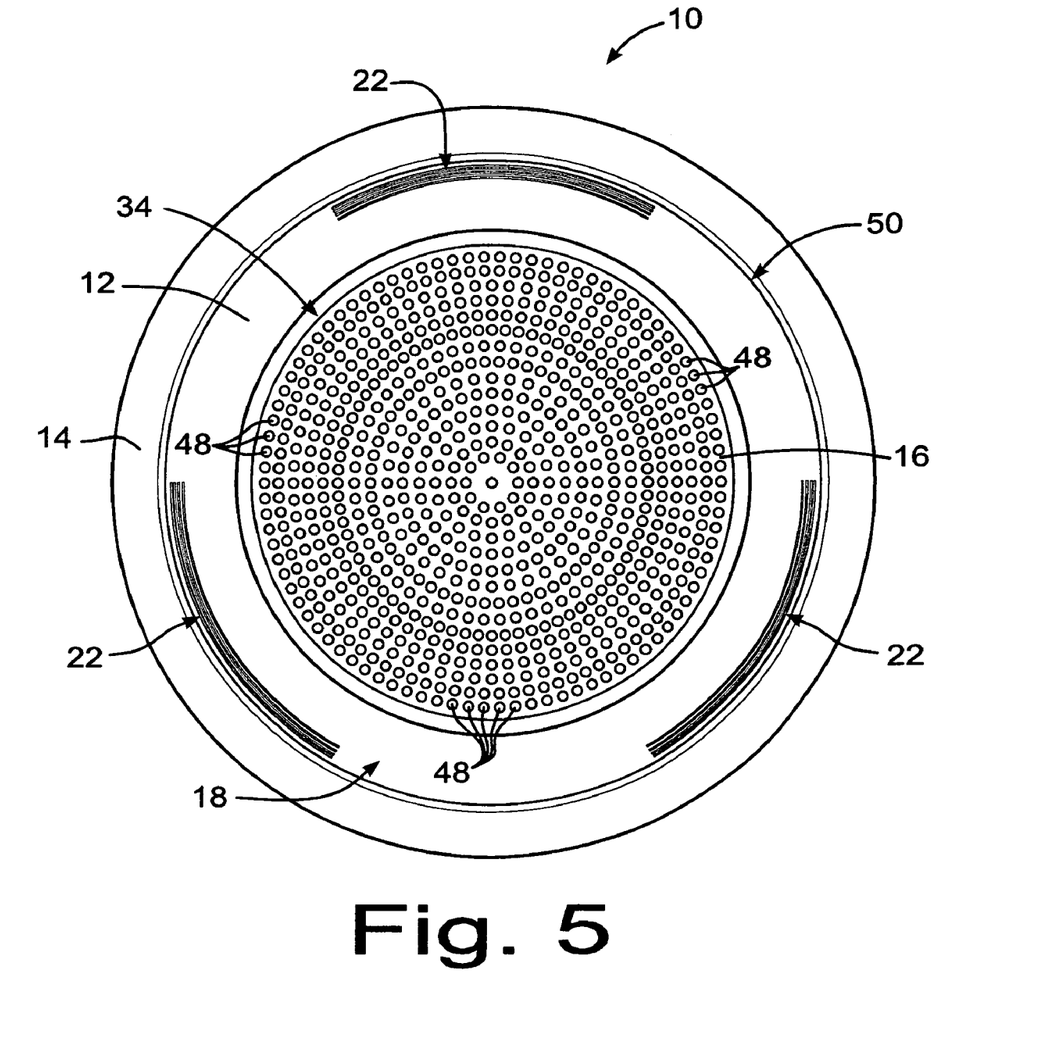
FIG. 5 is a top view of yet another alternative embodiment of the base plate of the present invention.

For example, yet another alternative embodiment of the present invention is depicted in FIG. 5 which shows a plurality of apertures 34 comprises a plurality of holes 48. Preferably, the holes 48 are substantially circular, of equal size and evenly distributed across the base plate 16. It is within the scope of the present invention, however, to vary the shape of the holes 48 and/or the size of the holes 48 and/or locate the holes 48 in a pre-determined area or areas of the base plate 16.

Figure 6:
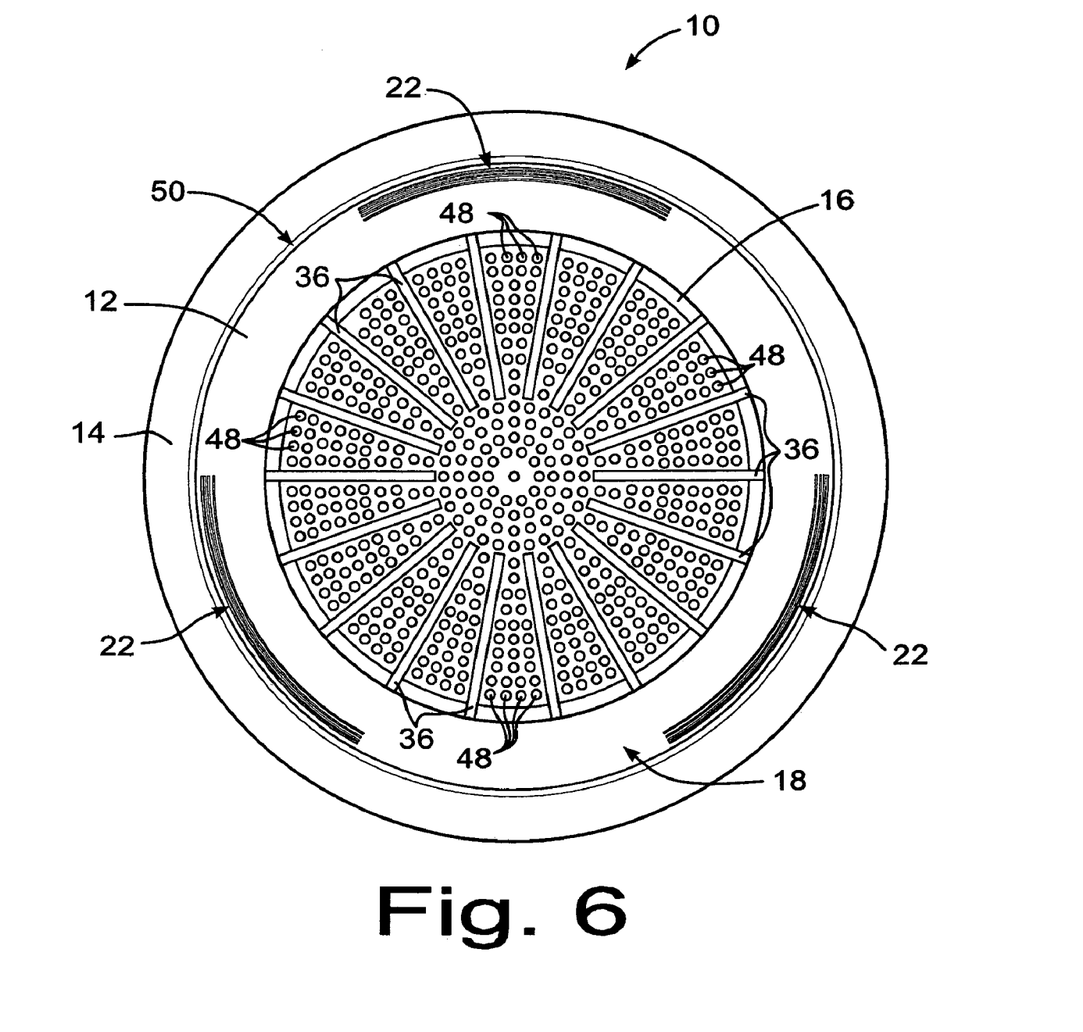
FIG. 6 is a top view of yet another alternative embodiment of the base plate of the present invention.

FIG. 6 depicts yet another alternative embodiment of the base plate 16. As shown in FIG. 6, the base plate 16 comprises a combination of a plurality of slots 36 and a plurality of holes 48. It should be appreciated that other combinations of slots and holes, or other combinations of apertures, as described above, are also within the scope of the present invention.

As stated above, a lip 14 is provided about the shell 12. In the preferred embodiment, best seen in FIGS. 1 and 3, the lip 14 is located about the upper portion 20 of the shell. It is also preferred that the lip 14 extends circumferentially about the upper portion 20, however, a non-continuous lip 14 is equally within the scope of the present invention.

As shown in FIG. 2, the lip 14 preferably circumscribes an opening 50 in the shell 12 to the inner portion 18. Those skilled in the art will appreciate, however, that the lip 14 may be located anywhere on the shell 12 without departing from the spirit of the present invention.

Figure 7:
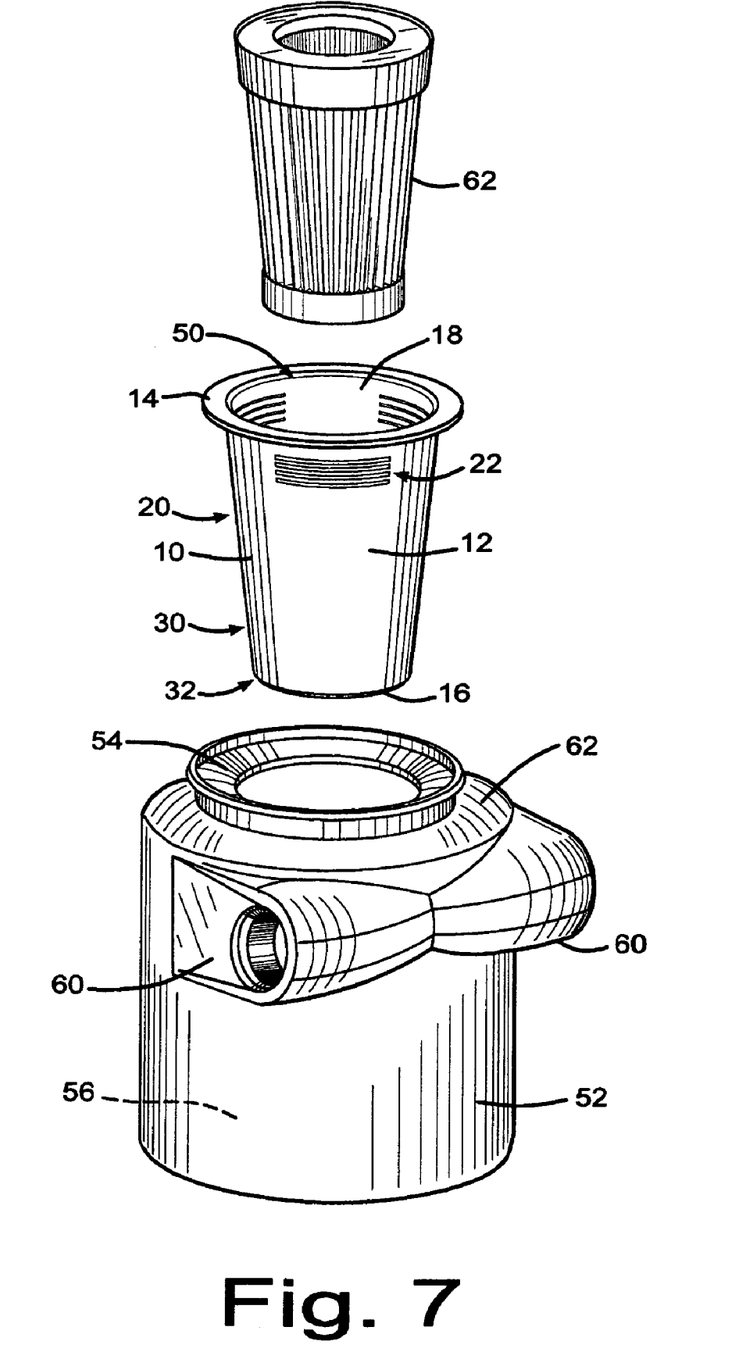
FIG. 7 is an exploded side view of a filter, the filter cup and a debris containment portion.
Figure 8:
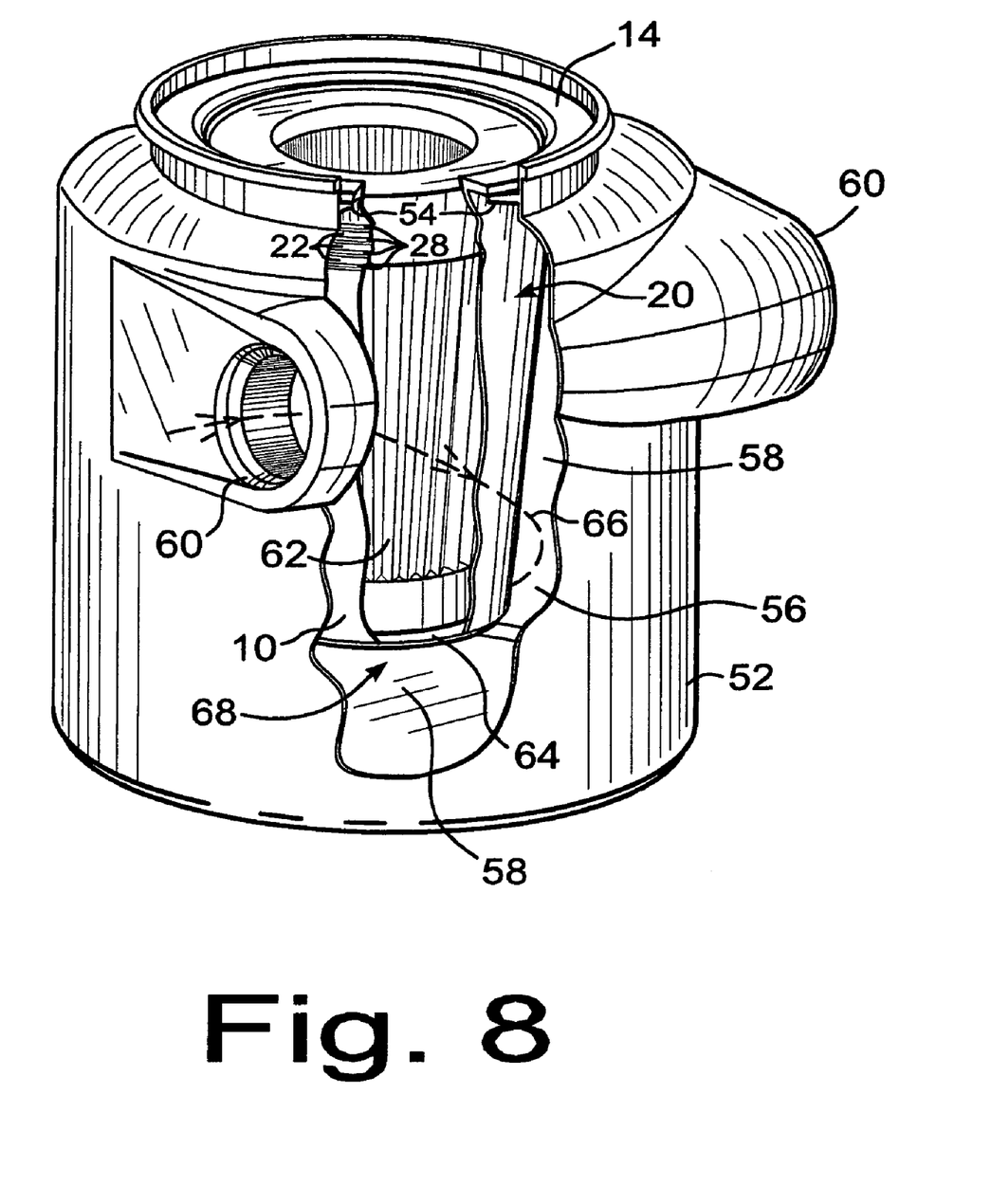
FIG. 8 is a partial cutaway, side view depicting the filter, the filter cup and the debris containment portion assembled together.

The filter cup 10 preferably fits within a debris containment portion 52 of a vacuum cleaner (vacuum cleaner not shown), as best seen in FIGS. 7 and 8. Although a locking mechanism can be used to secure the filter cup 10 to the debris containment portion 52, it is preferred that the lip 14 of the filter cup 10 rests on a top edge 54 of the debris containment portion 52. The filter cup 10 can be selectively inserted into and removed from the debris containment portion 52.

The filter cup 10 is suspended by the lip 14 within a substantially hollow interior portion 56 of the debris containment portion 52. A gap 58 is preferably located between the filter cup 10 and the debris containment portion 52, as best seen in FIG. 8. The gap 58 preferably extends all about and below the filter cup 10. The gap 58 may be constant or it may vary.

The debris containment portion 52 also preferably has at least one debris inlet 60, which can be seen in FIGS. 7 and 8. It is within the scope of the present invention for the debris containment portion 52 to have more than one debris inlet 60 and for the inlet or inlets 60 to be located anywhere on the debris containment portion 52 and in any orientation. As depicted in FIGS. 7 and 8, it is preferred that the debris inlets 60 are positioned on the debris containment portion 52 to introduce debris and air tangentially to the filter cup 10 in the interior portion 56 of the debris containment portion 52. It should be appreciated, however, that the present invention is not limited to tangential discharge debris inlets 60.

A filter 62, as depicted in FIGS. 7 and 8, is located in the interior portion 18 of the cup 10. The filter 62 may be located in contact with the cup 10, including the base plate 16, or a gap 64 may be located between the shell 12 and/or base plate 16 and the filter 62. The filter 62 may be pleated or non-pleated, tapered or non-tapered, tubular or solid and have any degree of porosity known to those skilled in the art. The filter 62 may be located within the filter cup 10 before or after the filter cup 10 is located in the debris containment portion 52.

Those skilled in the art know that a debris collecting device, such as a vacuum wand (not shown), is located in fluid connection (such as with a hose, not shown) with the inlet 60 of the debris containment portion 52. A motor (not shown) spins a fan (not shown) to generate vacuum. The filter 62, the filter cup 10, the debris containment portion 52 and the hose connected to the inlet 60 of the debris containment portion 52 are in the fluid path of the vacuum.

The vacuum draws fluid, such as air containing dirt and debris, through the hose and into the inlet 60. As stated above, the inlet 60 discharges the fluid into the debris containment portion 52 tangentially with respect to the filter cup 10.

Tangential discharge of the fluid into the debris containment portion 52 is preferred for at least two reasons. First, it creates a vortex 66 within the debris containment portion 52. The vortex 66 helps remove the dirt and debris from the fluid as known to those skilled in the art. Secondly, tangentially discharging the fluid into the debris containment portion 52 prevents or reduces dirt and debris from being directed directly into the filter cup 10.

The ribs 28, 40, and/or 46 between the apertures 22, 34 in the upper portion 20 of the filter cup 10 and in the base plate 16 prevent or reduce debris of a predetermined size from passing through the apertures 22, 34. Of course, the size, shape and number of the apertures 22, 34 determines the quantity of debris that pass therethrough.

Dirt and debris laden fluid passes through the apertures 22, 34 in the upper portion 20 and in the base plate 16 and into the filter 62 by virtue of the vacuum. Vacuum filters 62 are well-known to those skilled in the art and therefore a detailed discussion of their operation is not included.

The apertures 34 in the base plate 16 are located in a center portion 68 of the vortex 66 within the debris containment portion 52. The fluid in the center portion 68 of the vortex 66 is slower and thus generally has less dirt and debris than other portions of the vortex 66. Air is drawn into the base plate apertures 34 from the center portion 68 of the vortex 66 by virtue of the vacuum. Therefore, the fluid drawn through the base plate apertures 34 and into the filter 62 has a reduced quantity of dirt and debris. It can be appreciated that fluid having a reduced quantity of dirt and debris will not rapidly saturate the filter 62. The filter cup 10 thus advantageously extends the life of the filter.

The apertures 34 in the base plate 16 also reduce the quantity and velocity of fluid entering into the apertures 22 in the upper portion 20 of the filter cup 10 at least by providing additional means for the vacuum-pulled fluid to enter the filter cup 10.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A filter cup, comprising:
a shell having a first portion with a plurality of apertures for permitting fluid flow into an interior portion of said shell, said shell also having an aperture-free second portion;
an outwardly extending radial lip located about said first portion of said shell; and
a base plate connected to said second portion of said shell, said base plate having at least one aperture therethrough.

2. The filter cup of claim 1, wherein said first portion is an upper portion of said shell.

3. The filter cup of claim 2, wherein said plurality of apertures in said first portion are sets of parallel slots.

4. The filter cup of claim 3, wherein multiple sets of slots are equally spaced circumferentially about said upper portion.

5. The filter cup of claim 1, wherein said aperture-free second portion extends circumferentially about said shell below said first portion.

6. The filter cup of claim 1, wherein said at least one aperture in said base plate is a plurality of slots, a plurality of holes, or a combination of slots and holes extending substantially across said base plate.

7. The filter cup of claim 6, wherein said slots of said plurality of slots in said base plate vary in length from one another.

8. The filter cup of claim 1, wherein said shell is cylindrical.

9. The filter cup of claim 1, wherein said shell is tapered inwardly toward said base plate.

10. The filter cup of claim 1, wherein said lip circumscribes an opening in said shell.

11. The filter cup of claim 1, wherein said at least one aperture in said base plate allows fluid to enter into said interior portion of said shell, said at least one aperture also reduces the velocity and quantity of fluid entering said shell through said plurality of apertures in said first portion of said shell.

12. The filter cup of claim 4, wherein at least one rib is located between each individual slot of said sets of slots, said rib blocks debris of a pre-determined size from entering into said interior portion of said shell.

13. A filter cup assembly, comprising:
a tubular filter cup, comprising:
a shell having a first portion with a plurality of apertures for permitting fluid flow into an interior portion of said shell, said shell also having an aperture-free second portion; and
a base plate connected to said second portion of said shell, said base plate having at least one aperture therethrough; and
a filter located within said interior portion of said filter cup.

14. The assembly of claim 13, further comprising a debris containment portion supporting said filter cup.

15. The assembly of claim 14, said at least one aperture in said base plate allows fluid to enter into said interior portion of said shell from a central portion of said debris containment portion, said at least one aperture reducing the velocity and quantity of fluid entering said shell through said plurality of apertures in said first portion of said shell.

16. The assembly of claim 14, wherein said debris containment portion has at least one debris inlet adjacent said shell.

17. The assembly of claim 16, wherein said at least one debris inlet is positioned on said debris containment portion to discharge debris and fluid into said debris containment portion in a non-perpendicular fashion to said shell.

* * * * *